A. McI. MAXWELL.
PHOTOGRAPHIC CAMERA.
APPLICATION FILED APR. 9, 1917.
1,291,994.
Patented Jan. 21, 1919.
2 SHEETS—SHEET 2.
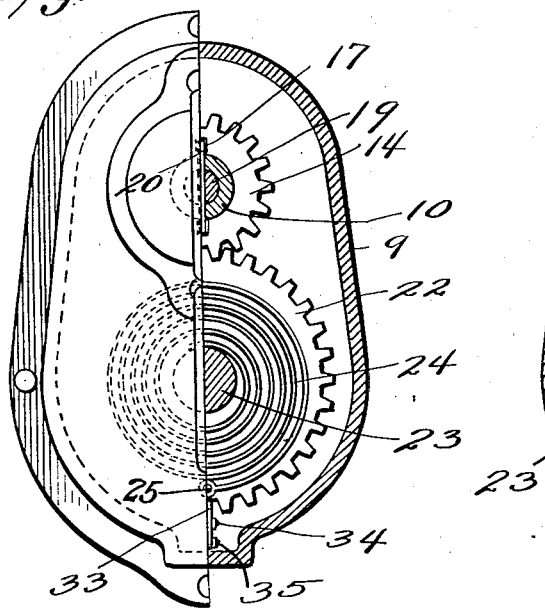
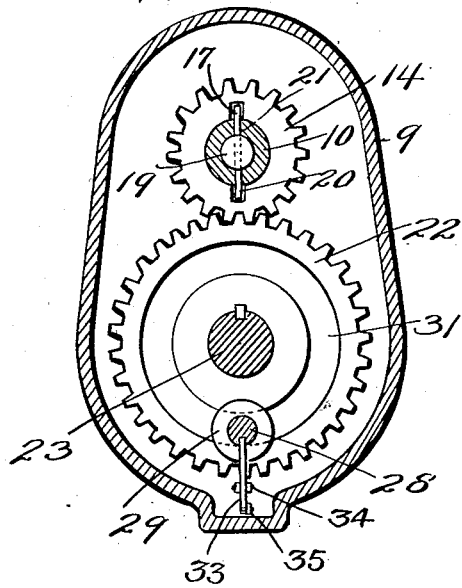
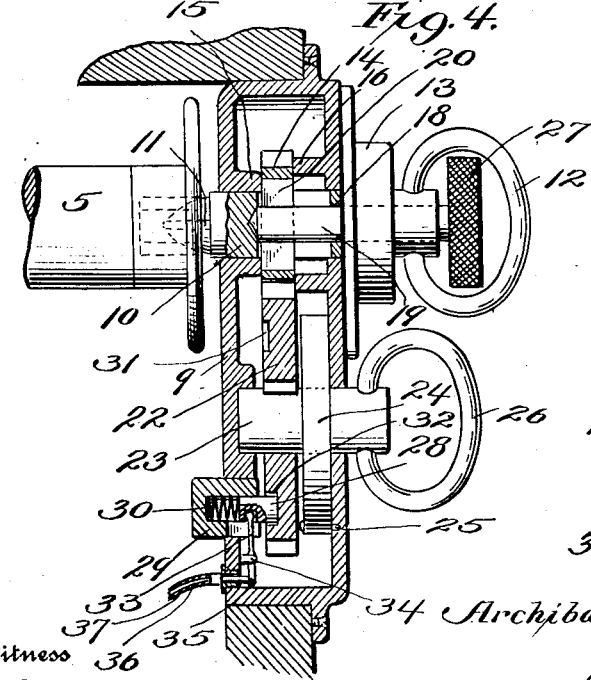
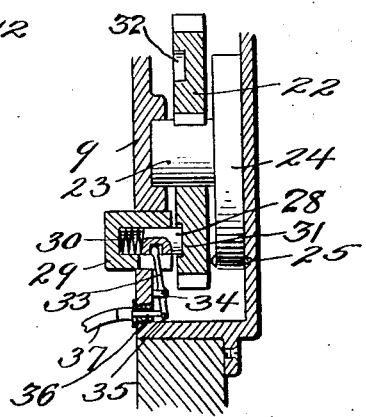
Inventor
Archibald McIntyre Maxwell

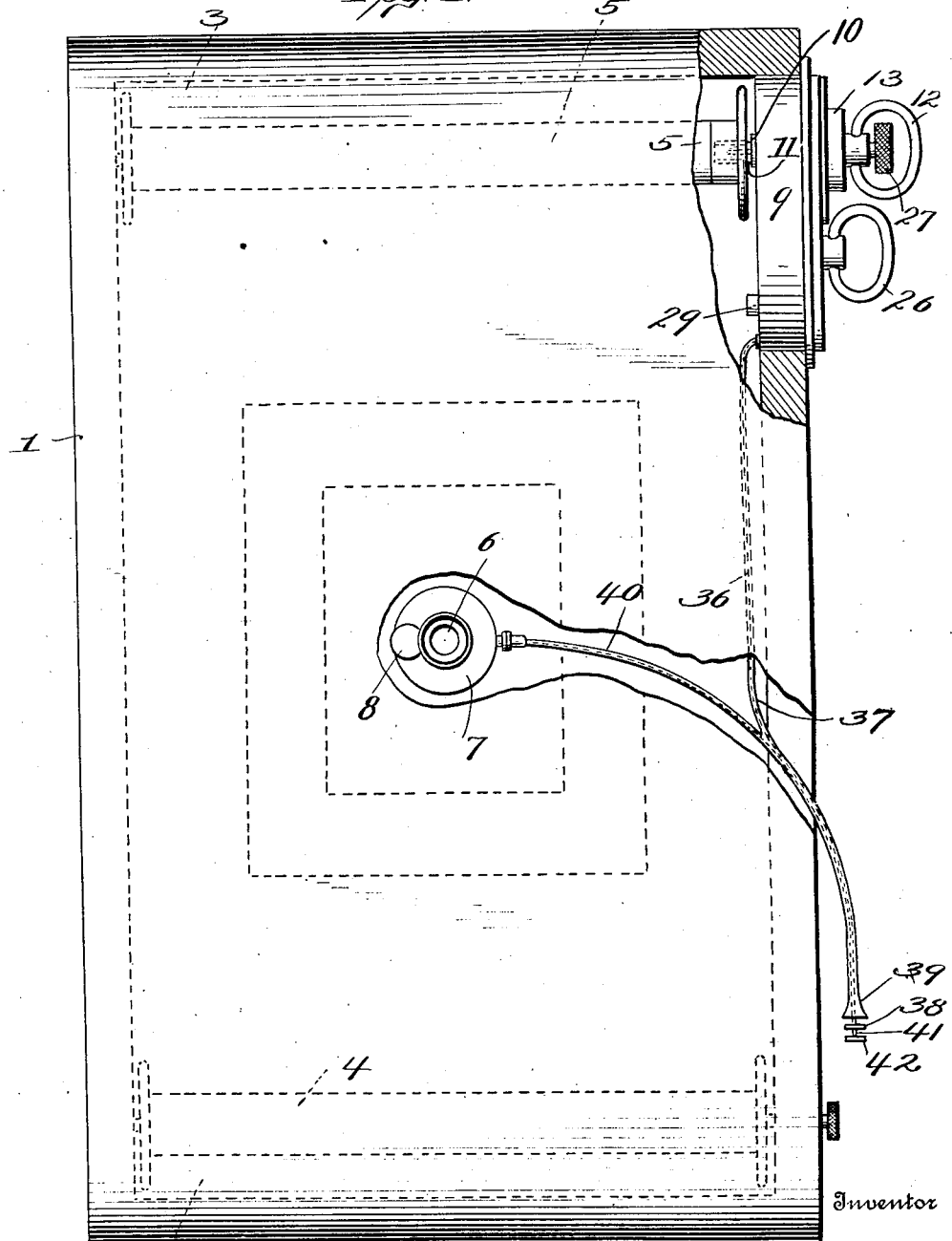

UNITED STATES PATENT OFFICE.

ARCHIBALD McINTYRE MAXWELL, OF ITHACA, NEW YORK.

PHOTOGRAPHIC CAMERA.

1,291,994.

Specification of Letters Patent. Patented Jan. 21, 1919.

Application filed April 9, 1917. Serial No. 160,796.

*To all whom it may concern:*

Be it known that I, ARCHIBALD MCINTYRE MAXWELL, a citizen of the United States, residing at Ithaca, in the county of Tompkins and State of New York, have invented new and useful Improvements in Photographic Cameras, of which the following is a specification.

The present invention relates to improvements in photographic cameras, and more especially to those of the class adapted to produce a series of exposures successively upon a sensitized film. The primary object of the invention is to provide for cameras of such class means whereby certainty in the feeding of a fresh portion of the sensitized film to the field of the lens after each exposure has been made is insured, the feeding means preferably acting automatically to advance the film after each exposure. In consequence, the operation of the camera in making exposures is greatly facilitated and liability of making more than one exposure upon the same portion of the film is avoided.

To these and other ends, the invention consists in certain improvements, and combinations and arrangements of parts, all as will be hereinafter more fully described, the novel features being pointed out particularly in the claims at the end of the specification.

In the accompanying drawing:—

Figure 1 is a general view, partly in section, of a roll holding or film camera equipped with film feeding or advancing means embodying the present invention.

Fig. 2 represents a face view, partly in section, of the mechanism comprising the film advancing means.
Fig. 3 represents a section through the film advancing means in a plane transverse to the axis of the film winding spool.

Fig. 4 is a detail sectional view of one corner of the camera showing the film advancing mechanism in section, and Fig. 5 is a detail sectional view of a portion of the film advancing mechanism.

Similar parts are designated by the same reference characters in the several views.
The present invention is applicable generally to so-called roll holding or film cameras, and more especially to the type wherein a length of sensitized film is unwound from one spool and wound upon another spool to feed a fresh portion of film to the field of exposure of the lens after each exposure has been made, the portion of the film to be exposed occupying a position between the two spools. Heretofore, it has been necessary in cameras of such class to manually wind the film upon the winding spool after each exposure in order to bring a fresh portion of the film into the field of exposure of the lens, and this operation of winding the film required not only manual manipulation by the photographer or user of the camera, but it depended upon the memory of the photographer or user of the camera and, upon failure to wind the film to bring a fresh portion thereof into the field of exposure of the lens, a double exposure upon the same portion of the film usually resulted, occasioning a waste of that portion of the film and the loss of such pictures. The present invention provides means whereby the feeding of a fresh portion of the film to the field of exposure of the lens is effected automatically immediately after an exposure has been made, thus avoiding more than one exposure of each portion or section of the film and obviating the inconvenience of manually winding the film after each exposure. The preferred embodiment of the invention is shown in the accompanying drawing and will be hereinafter described in detail. It is to be understood, however, that the invention is not restricted to the particular construction shown, as equivalent constructions are contemplated and will be included within the scope of the claims.

In the present embodiment of the invention, 1 designates generally the body of a camera of the roll holding type, the body having spool chambers 2 and 3 in its opposite ends, the chamber 2 being adapted to receive the spool 4 which contains the fresh film and from which spool the film is adapted to be unwound, and the chamber 3 containing the spool 5 upon which the exposed portions of the film are to be wound. The part of the film to be exposed spans the space between the spools, as usual in cameras of this type, and the exposures of the film are effected through the medium of a lens 6 which is provided with the usual or any suitable type of shutter 7 capable of making so-called instantaneous or snapshot and time exposures, the shutter shown being of the type having a dial 8 which may be set to produce the character of exposure desired.

The automatic film advancing device provided by the present invention comprises a suitable casing 9 which may be made of metal and set into one side of the camera casing. A centering and actuating shaft 10 for the winding spool 5 is journaled in the casing 9 and extends from the exterior through the casing and to the interior of the camera, the inner end of this shaft having a cross-bar or key 11 adapted to engage in the usual key slots formed in the end of the spool, and the end of the shaft 10 is adapted to engage in a recess in the end of the spool to center the latter, this arrangement being similar to that usually employed for the film winding and spool centering key of the ordinary roll holding camera. The outer end of the shaft 10 has an operating handle 12, and a ratchet 13 may be provided similar to the ratchet usually employed on film winding keys to prevent backward rotation of the film winding spool. A pinion 14 is loosely mounted on the shaft 10, it being held from longitudinal displacement relatively to the shaft by the bearings 15 and 16 of the casing, and this pinion is provided in the present instance with key slots 17. The shaft 10 has a central longitudinal bore 18 which extends to its outer end, and a pin 19 is fitted into said bore and is movable longitudinally therein. This pin 19 carries a key 20 which extends through slots 21 formed in the shaft 10, and the outer ends of the key are adapted to engage in the key slots 17 of the pinion 14 when the pin 19 occupies its inner position, and when the pin 19 is drawn outwardly, the key 20 will pass out of the key slots 17 in the pinion, the slots 21 in the shaft 10 being elongated to permit such movement. The pinion 14 meshes or coöperates with a gear 22, the latter being keyed or otherwise fixed to a shaft 23, and the shaft 23 is journaled or mounted in the casing 9 at one side of the shaft 10. A spring 24 is provided for winding the film upon the winding spool 5, one end of this spring being fixed to the casing, as at 25, and its opposite end being fixed to the shaft 23 carrying the gear 22. The outer end of the shaft 23 is provided with a handle 26 adapted for use in the winding of the spring 24. The outer end of the pin 19 is also provided with a handle or milled head 27 which is adapted to serve as means for withdrawing and restoring the pin 19. Rotation of the gear 22 under the action of the spring 24 is controlled by a detent, that shown comprising a plunger 28 which is fitted to reciprocate in a guide 29, and the plunger is normally pressed into coöperative relation with the gear 22 by a spring 30 located behind the plunger. The detent or plunger operates in a helical groove 31 formed in the adjacent side of the gear 22, a shoulder 32 being formed in the groove and serving as a stop to coöperate with the detent or plunger. While the plunger is in its innermost position and in engagement with the shoulder in the groove 31, the gear 22 will be held from rotation, but when the plunger is retracted sufficiently to clear the shoulder 32, the gear 22 is permitted to rotate under the influence of the spring 24 until the shoulder 32 again comes against the plunger 28, whereupon rotation of the gear 22 will be interrupted.

According to the present invention, means is provided whereby the detent or plunger 28, which controls the advancement of the film, is actuated or retracted in such relation to the means which produces the exposure by admitting light to the film that retraction of the detent or plunger to cause advancement of the film naturally follows or is a part of the operation of producing an exposure. Preferably, and as shown in the present instance, the detent or plunger is operated by a lever 33 which is pivoted in the casing 9 at 34 and is operatively connected at 35 to a flexible wire 36, this wire being of suitable length and inclosed within a flexible sheath 37, and the opposite end of the wire is provided with a handle or button 38 located adjacent to a hand-piece 39, the wire 36 and sheath 37 being similar to the well known Bowden wire, it being understood that one end of the sheath is connected to the casing 9 and the opposite end thereof to the hand-piece 39. The device for operating the shutter 7 to produce the exposures is similar to the Bowden wire control used upon certain cameras, it comprising a sheath 40, one end of which is connected to the casing of the shutter and the opposite end of which is connected to the hand-piece 39, and a wire 41, one end of which is connected to the exposure-producing part of the shutter 7, and the opposite end of the wire is provided with a handle or button 42. The button 38 which controls the film advancing means is located adjacent to the hand-piece 39 and immediately behind and in the path of the button 42 which actuates the shutter to produce an exposure.

The mode of operation of the invention may be described, briefly, as follows:—A spool containing a fresh film is introduced in the usual way into the spool chamber 2, and the outer end of the film cartridge is connected to the winding spool 5 in the chamber 3 of the camera. In order that the film cartridge may be wound upon the winding spool 5 to an extent sufficient to bring the first section of the film into position for exposure by the lens, the pin 19 is withdrawn by pulling outwardly upon the handle or milled head 27, the key 20 being thereby disengaged from the pinion 14 and the shaft 10 is then free to be rotated in the proper direction by manipulation of its handle 12 to wind the film upon the spool 5. While the pin 19 is withdrawn, the film-actuating spring 24 may be wound by rotating the shaft 23 through the medium of its handle 26, the detent or plunger 28 then acting as a ratchet which permits motion of the gear 22 in a direction to wind the spring. When the film has been advanced sufficiently to bring the first section thereof in position for exposure and the spring has been wound, the pin 19 is returned or moved inwardly to the position where the key 20 thereon engages in the key slots 17 of the pinion 14, the latter being then coupled or connected to the shaft 10. The camera is then in condition for use, and by appropriately setting the shutter, instantaneous or snapshot exposures and also so-called time exposures may be made. If it is desired to make a snapshot or instantaneous exposure, the shutter is so set, and it is only necessary for the photographer or user of the camera to press the button 42 to its full extent of movement. The first part of the movement of the button 42 will, in the usual way, operate the shutter to effect the exposure, and the latter part of the movement, or the continued movement of the button 42, will cause the button 38 to move with it. The movement so imparted to the button 38 will cause the wire 36 to act on the lever 33, the latter acting on the detent or plunger 28 to retract it from its engagement with the shoulder 32 on the gear 22. The gear 22 will then rotate under the action of the spring 24 through one revolution, its rotation being interrupted by the reëngagement of the detent or plunger 28 with the shoulder 32, and the rotary movement of the gear 22 is transmitted to the pinion 14 which in turn transmits its motion through the key 20 to the shaft 10, rotation of the latter causing winding movement of the spool 5. If a so-called time exposure is desired, the shutter is set accordingly, as is usual with the ordinary shutter, but the button 42 is pressed or moved toward the hand-piece 39 only to an extent sufficient to cause opening of the shutter, the button 42 being permitted to return to its former position and the exposure is terminated by a second pressure upon the button 42. The second pressure upon the button 42, however, will be sufficient to bring it against the button 38 and to move this latter button toward the hand-piece 39. In consequence, the detent 28 will release the gear 22, and the latter acting under the influence of the spring 24 will wind the film. In either case, the film is advanced immediately after an exposure has been made, thereby winding the exposed section of the film and bringing a fresh portion of the film in position for exposure.

It is to be understood that the ratio of the gears 14 and 22 will be determined according to the length of the section of film to be exposed, and that the ratio of these gears may be varied to suit the requirements of different cameras. After all the sections of the film have been exposed, the pin 19 may be retracted to disconnect the shaft 10 from the pinion 14, and the shaft 10 may then be turned by the handle 12 to complete the winding of the film upon the spool 5. The exposed film may then be removed, in the usual way, from the camera.

I claim as my invention:—

1. In a photographic camera having means for advancing sensitized surfaces to exposing position, and a shutter for causing exposures of said surfaces, the combination of a shutter actuating member, and a member for controlling operation of said advancing means, the shutter actuating member being operative independently of the member controlling the film advancing means and the shutter actuating member being also operative in a given direction to first actuate the shutter and by further movement in the same direction to subsequently actuate the member controlling said advancing means.

2. In a photographic camera having means for advancing sensitized material to effect successive exposures thereof, and a shutter for causing such exposures, the combination of coöperative members operative sequentially one by the other by movement of one of said members in one direction to first actuate the shutter to produce an exposure and subsequently by movement thereof in the same direction to release for operation the advancing means for the sensitized material, and one of said members being also operative independently of the other member to actuate the shutter without causing operation of said advancing means.

3. In a photographic camera having means for advancing sensitized material for successive exposures thereof, and a shutter for causing such exposures, the combination of a member operative initially by movement thereof in one direction to actuate the shutter to produce an exposure, and a member operative subsequently by movement of the shutter operating member in the same direction to release for operation the advancing means for the sensitized material, the shutter actuating member being also capable of actuation independently of the member second mentioned.

4. In a photographic camera having film advancing means, and a shutter for producing successive exposures on the film, the combination of a member controlling operation of the film advancing means, and a shutter actuator operative initially by movement thereof in one direction to actuate the shutter to produce an exposure and operative either by a second actuation thereof or by a continued movement thereof in the same direction to actuate the member controlling the film advancing means.

5. In a photographic camera having means normally tending to advance a film, and a shutter for controlling exposure of the film, the combination of means controlling operation of the film advancing means, and means movable in a given direction for initially controlling the shutter and by a further movement in the same direction for subsequently governing operation of the controlling means for the film advancing means.

6. In a photographic camera having means normally active to advance a film, and a shutter for controlling exposure of the film, the combination therewith of coöperative members operative sequentially by movement of one of said members in one direction to actuate the shutter to produce an exposure and to release the film advancing means, one of said members being also capable of operation to initiate an exposure without releasing the film advancing means.

7. In a photographic camera having automatic means for advancing a film, and exposure producing means therefor, the combination of a reciprocable controlling button for effecting actuation of the film advancing means, and a reciprocable shutter controlling button adjacent to and movable toward and from the film controlling button, said shutter controlling button being reciprocable independently of the film controlling button to actuate the shutter to cause an exposure and also being reciprocable in unison with said film controlling button to cause advancement of the film.

8. In a photographic camera having means normally tending to advance a film to bring portions thereof successively into exposing position, and exposure controlling means for the film, the combination of means controlling the operation of the film advancing means, and means operative when moved in one direction to actuate the exposure controlling means independently of the controlling means for the film advancing means and also operative by a single movement in said direction to actuate the controlling means for the exposure controlling means and the film advancing means.

9. In a photographic camera having spring actuated means for advancing a sensitized medium, a detent controlling the operation thereof, and exposure controlling means, the combination of a member for actuating the detent to cause operation of the film advancing means, and a member having one range of movement in a given direction wherein it is operative to actuate the exposure controlling means and having another range of movement in the same direction wherein it is operative to actuate the exposure controlling means and also the detent-actuating member.

In testimony whereof I have hereunto set my hand in presence of two subscribing witnesses.

ARCHIBALD McINTYRE MAXWELL.

Witnesses:
WM. WHEFFINGWELL,
NICHOLAS H. KILEY.